United States Patent
Gandemer et al.

(10) Patent No.: US 7,240,952 B2
(45) Date of Patent: Jul. 10, 2007

(54) VEHICLE FITTED WITH A PERMEABLE PASSENGER COMPARTMENT CANOPY

(75) Inventors: Jacques Gandemer, Nantes (FR); Gerard Queveau, Le Pin (FR)

(73) Assignee: Heuliz/CSTB (FR)

( * ) Notice: Subject to any disclaimer, the term of this patent is extended or adjusted under 35 U.S.C. 154(b) by 111 days.

(21) Appl. No.: 11/241,641

(22) Filed: Sep. 30, 2005

(65) Prior Publication Data
US 2006/0076797 A1   Apr. 13, 2006

(30) Foreign Application Priority Data
Oct. 1, 2004   (FR) ................................. 04 01397

(51) Int. Cl.
*B60J 7/00* (2006.01)
(52) U.S. Cl. .................. 296/107.06; 296/214
(58) Field of Classification Search ......... 296/107.06, 296/214, 103, 218, 219
See application file for complete search history.

(56) References Cited

U.S. PATENT DOCUMENTS 5,540,476 A * 7/1996 Cowsert ................. 296/107.11
6,318,791 B1 * 11/2001 Pfertner ................. 296/107.06

FOREIGN PATENT DOCUMENTS

| DE | 909 892 | 4/1954 |
| DE | 198 37 506 A1 | 2/2000 |
| DE | 100 31 007 A1 | 1/2002 |
| EP | 0 827 856 A1 | 3/1998 |

* cited by examiner

*Primary Examiner*—Joseph D. Pape
(74) *Attorney, Agent, or Firm*—Bachman & LaPointe

(57) ABSTRACT

A convertible vehicle having a movable roof is fitted with a passenger compartment canopy that has an air permeable structure. This vehicle, whose roof, such as a foldaway rigid roof, hard-top or soft-top, is movable in relation to its structure, comprises releasable connections interposed between the structure of the vehicle and the canopy, so that when the movable roof is placed at least partially at a distance from a position above the passenger compartment, the canopy is arranged in a movable or removable manner above this compartment.

15 Claims, 4 Drawing Sheets

VEHICLE FITTED WITH A PERMEABLE PASSENGER COMPARTMENT CANOPY

BACKGROUND OF THE INVENTION

Field of the Invention

The invention relates to the covering of the opening located above the passenger compartment of a convertible vehicle with a movable roof, by an air permeable structure that allows air flow. The objects of the invention therefore relate to a passenger compartment canopy and a thereby equipped vehicle.

The expression "canopy" is a covering means capable of selectively covering the opening located above the passenger compartment of the vehicle.

The invention is especially suited for a vehicle with a movable roof, even removable. Such roofs can be, for example, hard-tops (typically removable), foldaway or retractable rigid roofs, also known as Rétractop ™, or soft-tops. The two latter roofs can be motorised in order to allow the displacement of the roof via swivelling or sliding in relation to the structure of the vehicle, either partially or fully automated, towards a storage position normally located towards the rear of the vehicle.

SUMMARY OF THE INVENTION

Convertible vehicles are usually subject to the flow and eddy of turbulent air within the vehicle. One purpose of the invention is to considerably reduce or even eliminate such turbulence.

For this reason, it is proposed that the passenger compartment canopy, as such and as an element fitted to the vehicle, comprises an air permeable structure, preferably with an air permeability of about 10% to 70%.

Advantageously, this permeability will come from orifices in the canopy.

Other major features will be claimed with all or part of the following advantages:

the reduction of air re-circulation and air pulsation within the passenger compartment whilst allowing light and air to flow through, hence the feeling of being in a convertible vehicle without the drawbacks;

the (air) permeable canopy provides protection against dust carried in flowing air, gusts of wind and to a certain extent external noise. It also allows provides a cosier feel to the passenger compartment by restricting visibility from the outside;

the (air) permeable canopy creates a more even flow of air, hence greatly reduced air turbulence around the vehicle which implies better air penetration and therefore lower fuel consumption.

As regards the vehicle fitted with the aforementioned canopy, different clever methods of fabrication are explained below. Among them, we have noted:

that (second) releasable connecting means can, in a removable manner, link the canopy to the movable roof, in particular when the roof covers the passenger compartment in its closed state, whilst allowing to release this removable canopy from its linkage to the roof, preferably prior to a displacement of this single roof from above the passenger compartment;

that these connecting means can provide a link between the canopy and the movable roof, preferably prior to removing the joint unit created by the passenger compartment canopy linked to the roof;

that the movable roof can be swivelled over the structure of the vehicle and be associated to motorised means for controlling in order to displace the roof towards a storage position located towards the rear of the vehicle;

that said (second) releasable connecting means can be controlled in a co-ordinated manner with the motorised means for controlling the roof, so that either the joint unit, the roof and the passenger compartment canopy, or the roof alone can be displaced.

BRIEF DESCRIPTION OF THE DRAWINGS

A more detailed description of the invention follows with reference to the annexed figures given by way of example and in which.

DETAILED DESCRIPTION OF THE PREFERRED EMBODIMENT(S)

Figure 1:
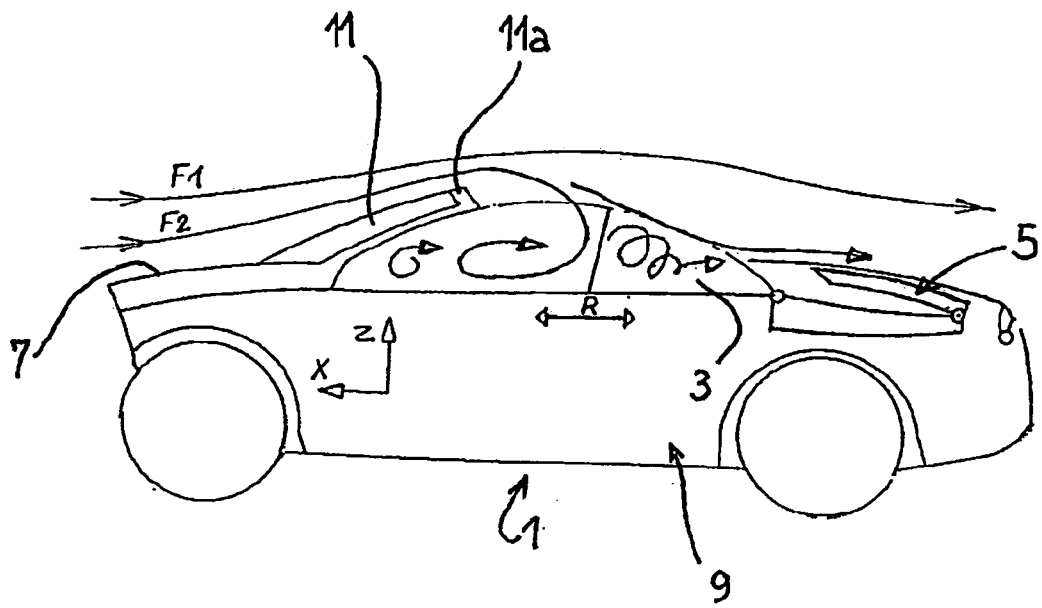
FIG. 1 represents a side view of a roofless vehicle and illustrates the air turbulence phenomena within the passenger compartment.

FIG. 1 therefore represents a convertible vehicle 1, in this case uncovered, that being with its passenger compartment 3 at least partially uncovered from the roof 5.

The vehicle is moving in a longitudinal direction X.

At a certain distance, or apart, from the passenger compartment, an air stream represented by the line F1 globally surrounds the obstacle and substantially follows the profile of the bodywork 7 which belongs to the body structure 9 of the vehicle.

As regards the air streams that are in direct contact with the bodywork (borderline layer) and represented by the line F2, the airflow "detaches" from the upper section of the windscreen 11 creating a flowing re-circulation (zone R) which re-loops inside the passenger compartment to compensate for the vacuum cavity created downstream of the windscreen. This flowing re-circulation is highly changeable, turbulent even swirling.

Depending on the design and dimensions of the vehicle (windscreen, passenger bay, height of the rear quarter light, etc.) and the rotational speed range of the vehicles, this fluctuating re-circulation will fill all or part of the passenger compartment 3, (for example the upstream/downstream half of the passenger compartment) with a fluctuating reattachment zone swooping into the passenger bay 3.

This air turbulence and pulsating air can have high localised speeds and variable directions, notably including vertical incidents, which renders it particularly unpleasant for the passengers.

Figure 2:
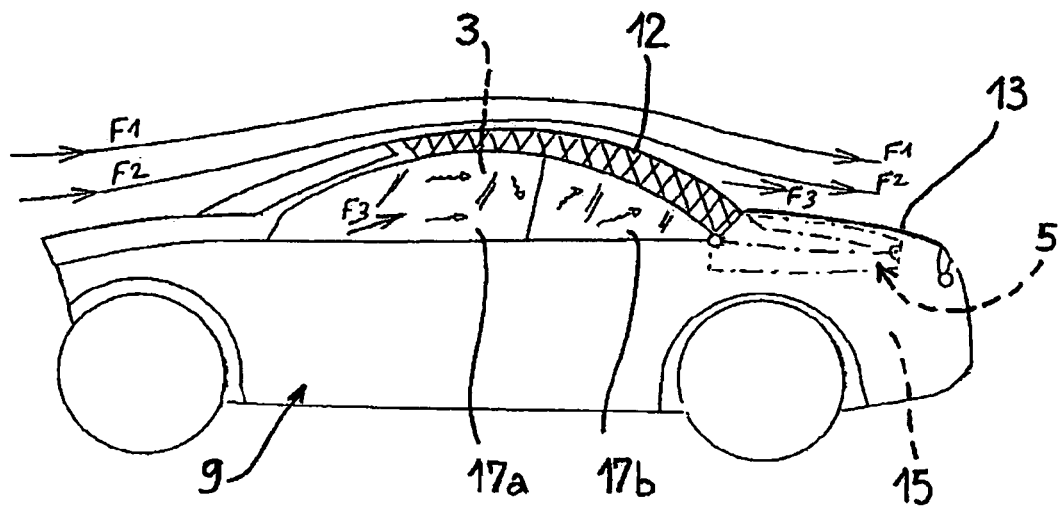
FIG. 2 represents a side view of a vehicle fitted with a canopy according to the invention.

FIG. 2 shows a convertible vehicle fitted with a canopy 12 according to the invention, that being a canopy with a air permeable structure.

The roof 5 is thus distanced from above the passenger compartment 3, in this case stored or retracted towards the rear of the vehicle, within an area under a hood 13 which can possibly be that of the boot 15.

The permeability of the canopy 12 is ensured by the orifices within its structure.

This canopy extends longitudinally above the passenger compartment 3 in the longitudinal direction X of the vehicle, starting from the upper chassis crossmember 11a of the windscreen to which it is linked, in particular attached, to the structure 9 of this vehicle (for example to this chassis crossmember 11a), and terminating at the front edge of the hood 13 of the boot, in the vicinity of which it is also linked, in particular attached, again to the fixed structure 9, and sideways, as far as the upper edge of the front and/or rear side windows 17a, 17b.

Figure 10:
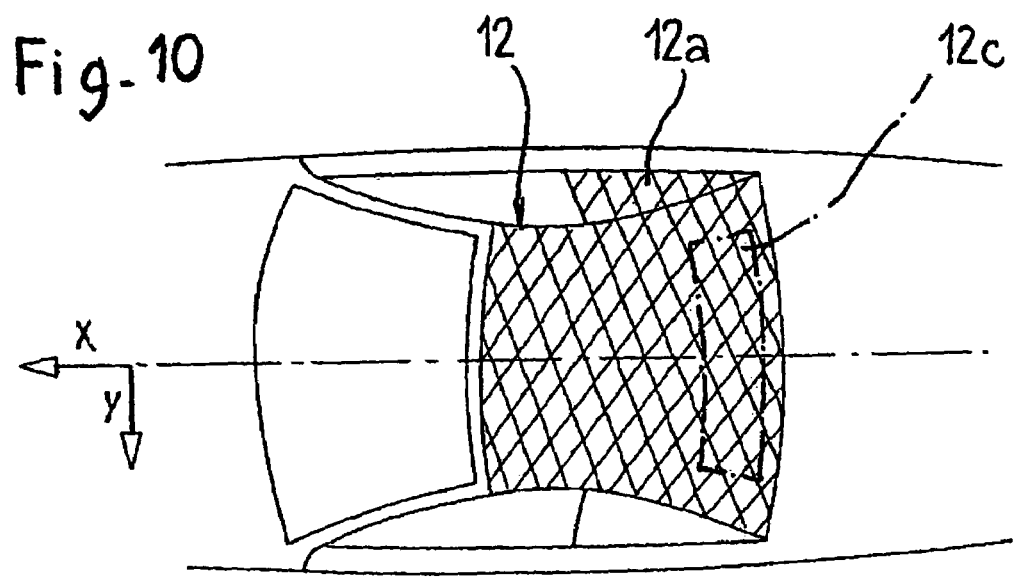
FIG. 10 represents a top view of a vehicle fitted with its canopy, the lower half view corresponding to the vehicle in FIG. 2, the upper half view corresponding to an alternative where the canopy also extends as far as the side windows.

The canopy can, if needs be, also cover the sections occupied by at least a section of these side windows, as shown in FIG. 10, upper half view, where it occupies the space of one of the rear side windows, at the location of its side extension 12a. The two side windows can be occupied.

Figure 6:
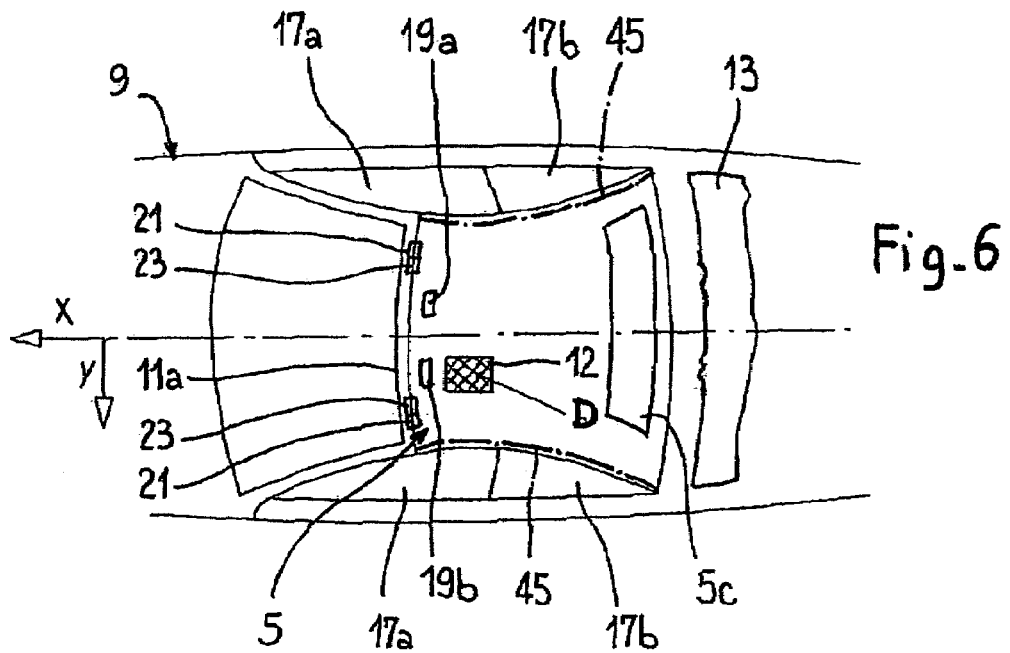
FIG. 6 represents a top view of a vehicle according to the invention.

Is was noted that such a device allows to notably avoid or reduce the phenomena of air turbulence and pulsating air disclosed in relation to FIG. 1. A rear opening 12c (FIGS. 9 and 10) can be made in the canopy 12 in a substantially central location, for example opposite the back window 5c which can also be provided for at the rear of the roof 5 (FIG. 6, single-piece roof, of hard-top type or FIG. 3, rear section 5b).

To obtain these different aerodynamic effects, the permeability level of the canopy was chosen to be between 10% and 70% (to within 15%) and preferably between 20% and 50%.

The permeability level is defined as being the relationship between the corresponding total surface occupied by the orifices and the given surface of the canopy. This gas permeable canopy, and possibly water resistant, plays the aerodynamic role of a "windbreak" and we noted a reduction, by about half, in the phenomena of air turbulence and pulsating air within the passenger compartment (for localised average speed, for localised top speed and for turbulence intensity).

The inside of the passenger compartment 3 is therefore slightly ventilated without any unpleasant drafts, the canopy 12 being hardly visible from within the passenger compartment.

The low visibility of the canopy can be further improved by reducing its thickness to the greatest extent possible, for example less than 1 mm. It is to be noted that inside the passenger compartment 3 there are weak flows of air F3 (FIG. 2), flowing air streams indifferently passing in and out of the permeable canopy.

Figure 3:
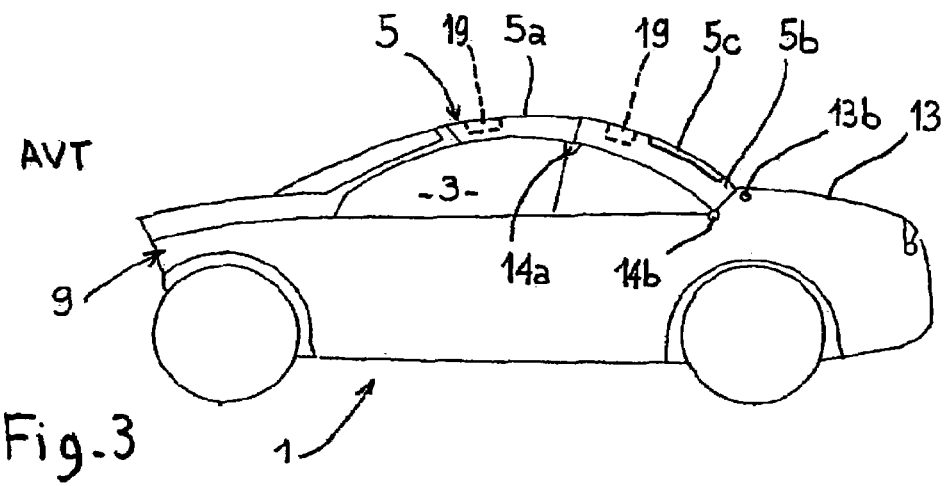
FIGS. 3, 4 and 5 represent three possible embodiments of a vehicle according to the invention.
Figure 4:
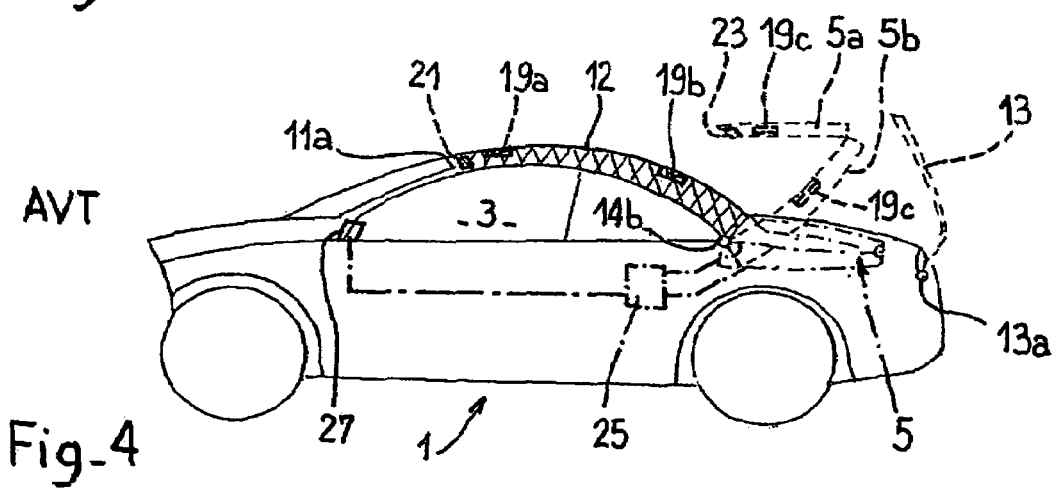
Figure 5:
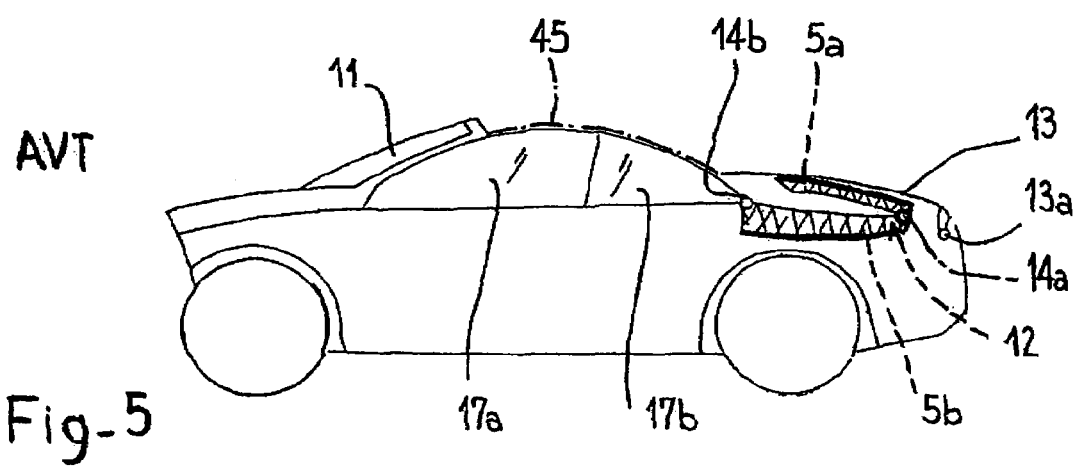

By way of example, FIGS. 3 to 5 show a convertible vehicle with a foldaway type rigid roof 5, permanently linked to the fixed structure 9 and in relation to which it swivels, but it could be any type of vehicle with a movable roof such as hard-tops or soft-tops.

The roof 5 comprises at least two sections, or elements, folding one on top of the other, in this case respectively a front section 5a and a rear section 5b located longitudinally behind the front section when the roof is placed above the closed passenger compartment (FIG. 3), and substantially opposite it (in this case above), in the stored state (FIG. 5).

Therefore, in this case, the roof is under the movable hood 13, which can at least open out from the front (AVT) to the rear of the vehicle, here tilted about a rear transversal pivot 13a. Opening towards the front is also envisaged, in particular via tilting about a front transversal pivot 13b. The marking 14a diagrammatically illustrates a transversal articulation (Y axis) between the front 5a and rear 5b sections, with 14b marking the rear transversal articulation of the rear section 5b of the roof in relation to the structure 9 to which it is linked.

FIG. 3 represents the vehicle 1 in a covered state, with its roof 5 closed, in the deployed position.

The canopy is thus just under the roof 5 in the position shown in FIG. 4. The canopy can thus advantageously constitute the interior lining of the roof.

FIG. 4 represents the vehicle with its roof 5 displaced towards the rear of the vehicle, the canopy thus being in a functional position, above the passenger compartment 3.

To allow such a movement of the roof 5 independent of the passenger compartment canopy 12 (in that the roof is folded or retracted from the structure 9 of the vehicle for example in a hard-top configuration), releasable connecting means 19 are advantageously provided to ensure a removable link between the roof and the canopy 12 (see FIG. 3).

These means are provided for on the canopy 12. They can be anchoring or gripping means, such as position locks. In FIG. 4 we can therefore see front 19a and rear 19b hooks assembled in a movable manner under the roof 5, in this case respectively on the lower face (closed roof) of its front 5a and rear 5b sections in order to co-operate with fixed rings 19c or inserts 19d provided for opposite them on the upper face of the canopy 12.

When the roof and the canopy 12 are to be linked as for example in FIG. 3 where they both cover the passenger compartment 3 (at least partially), the position locks 19a, 19b are in there locked position. On the contrary, when the canopy 12 and the roof 5 are to be separated from each other, the position locks 19a, 19b are to be released, either via an automaton or manually (the user therefore must have access to them, preferably from the inside of the vehicle, access is hence provided). Thus, the canopy 12 will be linked/anchored to the movable roof 5 when the roof covers the passenger compartment in a closed state (for example in FIG. 3), the canopy being on the contrary unattached to the roof preferably prior to the retraction or displacement of the latter, separate, see for example FIG. 4), unless the canopy 12 and roof 5 are to be displaced together (either by fully retracting them from the structure 9 of the vehicle, or by displacing them together, for example via an articulation of the canopy 12 in relation to the structure 9 of the vehicle). If the canopy 12 and the roof 5 (irrespective of its position) are to be displaced together, the position locks or releasable connecting means 19 will advantageously remain locked. This could be the case if, for example, it were to pass from the state in FIG. 3 to that in FIG. 5 where the vehicle is fully uncovered.

FIG. 5 shows the vehicle uncovered. In this third embodiment, the roof 5 as well as the canopy 12 have been folded away, or more generally displaced together towards the rear of the vehicle. Said roof sections are folded upon each other and the connecting means 19 are locked.

To perform this from the first embodiment, the canopy 12, linked therefore to the roof 19, is, along with this roof, separated (detached) from the windscreen crossmember 11a, then the tilting of the roof (in this case shown by 14b as swivelled over the structure or body 9 of the vehicle) draws the canopy with it.

If an independent mobility, as shown in FIGS. 4 and 5, is sought after between the passenger compartment canopy 12 and the roof 5 (irrespective of its position), then releasable connecting means marked 21, 23 in FIG. 4 are provided for a removable link between the structure 9 of the vehicle (in particular in the vicinity of its windscreen crossmember 11a) and respectively the canopy 12 and the roof 5.

In like image of the releasable means 19, the connecting means 21, 23 comprise on one hand a movable section and on the other hand a fixed section allowing to lock the movable section and therefore ensure the locking of the roof and/or the canopy 12 in their cover position over the passenger compartment 3, in relation to the structure 9. They can, in particular, be movable position locks or hooks engaging, in a free manner, into the provided corresponding rings or inserts, in particular therefore on the upper crossmember of the windscreen 11a. By releasing the position lock 23 only the roof 5 can be displaced (FIG. 4). By locking the position lock 21 the canopy 12 can be displaced.

Further to the rear, the rear articulation means 14b can be replaced by other releasable position locks linked on one side to the structure 9 and on the other side to the rear of the roof 5 and/or to the rear of the canopy 12, so as to hold back the roof and/or the canopy in relation to the structure of the vehicle or to allow the fully retraction of one and/or the other, together or independently, in relation to said structure 9.

It is to be noted that the connecting/separating operations of the canopy 12 as well as the displacement of the roof can be advantageously motorised and therefore partially or fully automated. To perform this, motorised and automated means for controlling are diagrammatised by marking 25 in FIG. 4 and are linked on one hand to means for articulating the roof (swing arm, runners . . . ) and/or to all or part of the aforementioned locking means 19, 21, 23 as well as for example to the dashboard 27 of the vehicle so that the driver can, if so desired, open or close the roof 5 and/or displace it into the covered position or release the canopy 12.

The third embodiment in FIG. 5 can correspond to that of a convertible vehicle.

FIGS. 7A to 8C represent several structural embodiments of the canopy 12.

The canopy 12 occupies, as does the roof 5, all the structural width available above the passenger compartment.

Figure 7A:
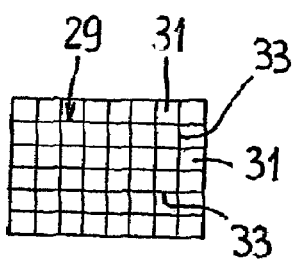
FIGS. 7A, 7B, 7C and 8A, 8B, 8C represent an enlarged view of different embodiments of section "D" of the canopy shown in FIG. 6.
Figure 7B:
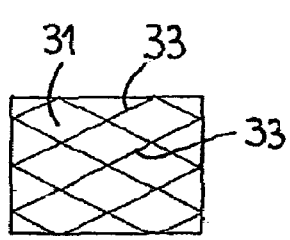
Figure 7C:
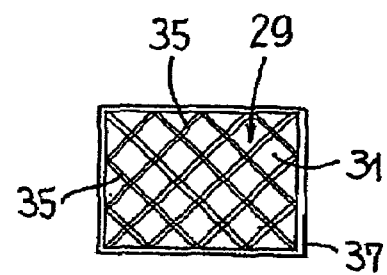

FIGS. 7A to 7C show a knitted structure 29 whose meshes 31 are created between the threads 33 (FIGS. 7A and 7B) or the interlocked strips 35 (FIG. 7C). The threads or strips can be flexible but advantageously taut or rigid. A structure forming either a drill or a grill is obtained.

In order to increase their mechanical resistance, the threads 33 or the strips 35 can be linked at their intersections, for example via welding or bonding.

In this instance, the meshes 31 are in the shape of squares or rhombuses, but can be in other shapes.

The interlocking strip structure can be made in the form of woven cane.

Such mesh structures can advantageously be in taut but flexible material, such as canvas, obtained for example via weaving and fixed to a rigid frame 37 in FIG. 7C, in this case a peripheral frame, the unit covering the passenger compartment. The frame 37 can be made in several articulated sections.

Figure 8A:
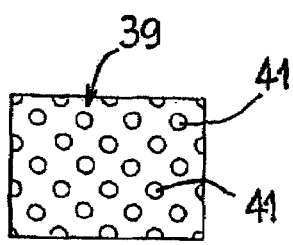
Figure 8B:
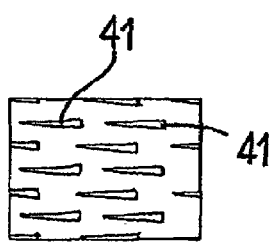
Figure 8C:
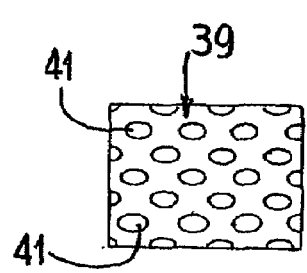

FIGS. 8A to 8C represent a structure in the shape of thin plates 39 pierced with openings 41 cut through he full width of the plates. The openings 41 can be of different shapes such as circular (FIG. 8A), V-shaped (FIG. 8B), oval (FIG. 8C), honeycombed or other.

They can be formed for example via injection, moulding or processes associating the fibres and the hardening resins: the material of the structure will therefore have a continuous shape allowing it to maintain a given shape and improve its resistance. The expression "given shape" means both the welt pattern, that being the assembled mesh, and the overall volume shape of the canopy. The maintaining of a given shape will be particularly beneficial when the structure is to follow the inside contour of a rigid roof which will be the case, in particular, of foldaway rigid roofs or hard-tops.

Figure 9:
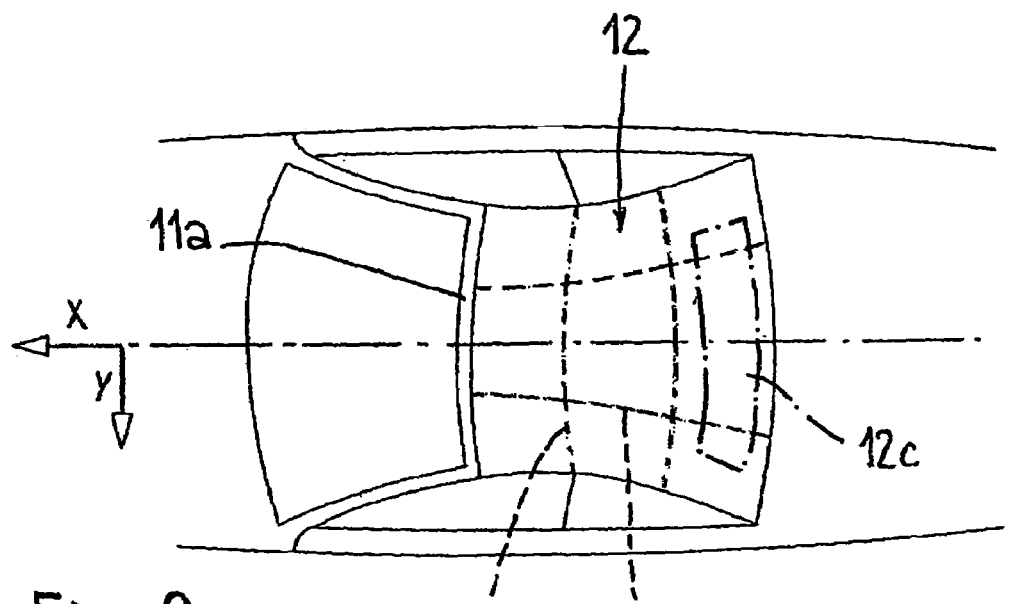
FIG. 9 represents a top view of a vehicle with the canopy equipped with stiffeners.

FIG. 9 shows, above the passenger compartment, a canopy 12 stiffened by stiffeners 43 which substantially extend both longitudinally (X axis) and transversally (Y axis) in relation to the vehicle.

The stiffeners 43 can also extend at an angle so as to take into account the weft of the mesh or the orifices. They can be embedded in the structure of the canopy and therefore formed at the same time as it.

Rather than being removable, the canopy 12 can be movable in relation to the structure 9 of the vehicle, between its state of covering the passenger compartment 3 (FIG. 4) and that of clearance above at least a section of this compartment (FIG. 5), for example by gliding along side runners provided along side sills or inserts 45, themselves fixed or removable in relation to the structure 9 and extending sideways (FIG. 6) along the length of the side boundaries of the upper crossmember 11a of the windscreen, substantially along the X axis. It therefore slides, in an articulated or non-articulated manner, along such runners.

The invention claimed is:

1. A convertible vehicle comprising:
 a body structure,
 a movable roof adapted to be moved relative to the body structure,
 a passenger compartment,
 a passenger compartment canopy which is permeable to air, and
 first releasable connecting means for releasably connecting the body structure and the passenger compartment canopy,
so that when the movable roof is disposed apart from a position above the passenger compartment, said passenger compartment canopy is removably disposable above the passenger compartment.

2. The convertible vehicle according to claim 1, wherein the passenger compartment canopy covers the passenger compartment essentially as a substitute of said movable roof, when:
 the passenger compartment canopy is disposed above the passenger compartment,
 said first releasable connecting means are connecting the passenger compartment canopy to the body structure,
 and the movable roof is disposed apart from above the passenger compartment.

3. The convertible vehicle according to claim 1 wherein the movable roof comprises a plurality of rigid roof elements movable one relative to the other, at least one of said plurality of rigid roof elements being articulated on the body structure, and the passenger compartment canopy comprises essentially a flexible canvas.

4. The convertible vehicle according to claim 2, wherein the passenger compartment covers lateral zones of the vehicle as a substitute for lateral windows.

5. The convertible vehicle according to claim 1, further comprising second releasable connecting means for connecting the passenger compartment canopy with the movable roof at least when said movable roof is covering the passenger compartment in a configuration in which said movable roof is disposed above said passenger compartment.

6. The convertible vehicle according to claim 5, wherein said second releasable connecting means are adapted for connecting said passenger compartment canopy with the movable roof, for allowing said connection to be released before the movable roof is displaced alone, independently from said passenger compartment canopy, apart from above the passenger compartment.

7. The convertible vehicle according to claim 5, wherein said second releasable connecting means are connecting the passenger compartment canopy with the movable roof, before they are both disposed together apart from above the passenger compartment.

8. The convertible vehicle according to claim 1, wherein the movable roof is articulated on the body structure and the vehicle further comprises motorized control means for moving the movable roof between a position above the passenger compartment and a storage position located near a rear part of the vehicle, apart from above the passenger compartment.

9. The convertible vehicle according to claim 1, wherein the passenger compartment canopy defines an interior lining of the movable roof.

10. The convertible vehicle according to claim 1, wherein the passenger compartment canopy has a permeable to air structure with a permeability to air ratio between 10% and 70%.

11. The convertible vehicle according to claim 10, wherein the permeable to air structure of the passenger compartment canopy has a permeability to air ratio comprised between 20% and 50%.

12. The convertible vehicle according to claim 1, wherein the passenger compartment canopy comprises one of a meshed structure and a structure having openings for air.

13. The convertible vehicle according to claim 1, wherein the passenger compartment canopy has an essentially flexible structure which is strengthened by strengthening means embedded with said structure.

14. The convertible vehicle according to claim 1, wherein the passenger compartment canopy has an essentially flexible structure which is strengthened by a first series and a second series of strengthening means, the strengthening means of the first series being transversally oriented relative to the strengthening means of the second series.

15. The convertible vehicle according to claim 1, wherein the passenger compartment canopy has an essentially flexible structure which is made of a flexible material and is peripherally fixed with a rigid frame.

* * * * *